Patented Dec. 8, 1925.

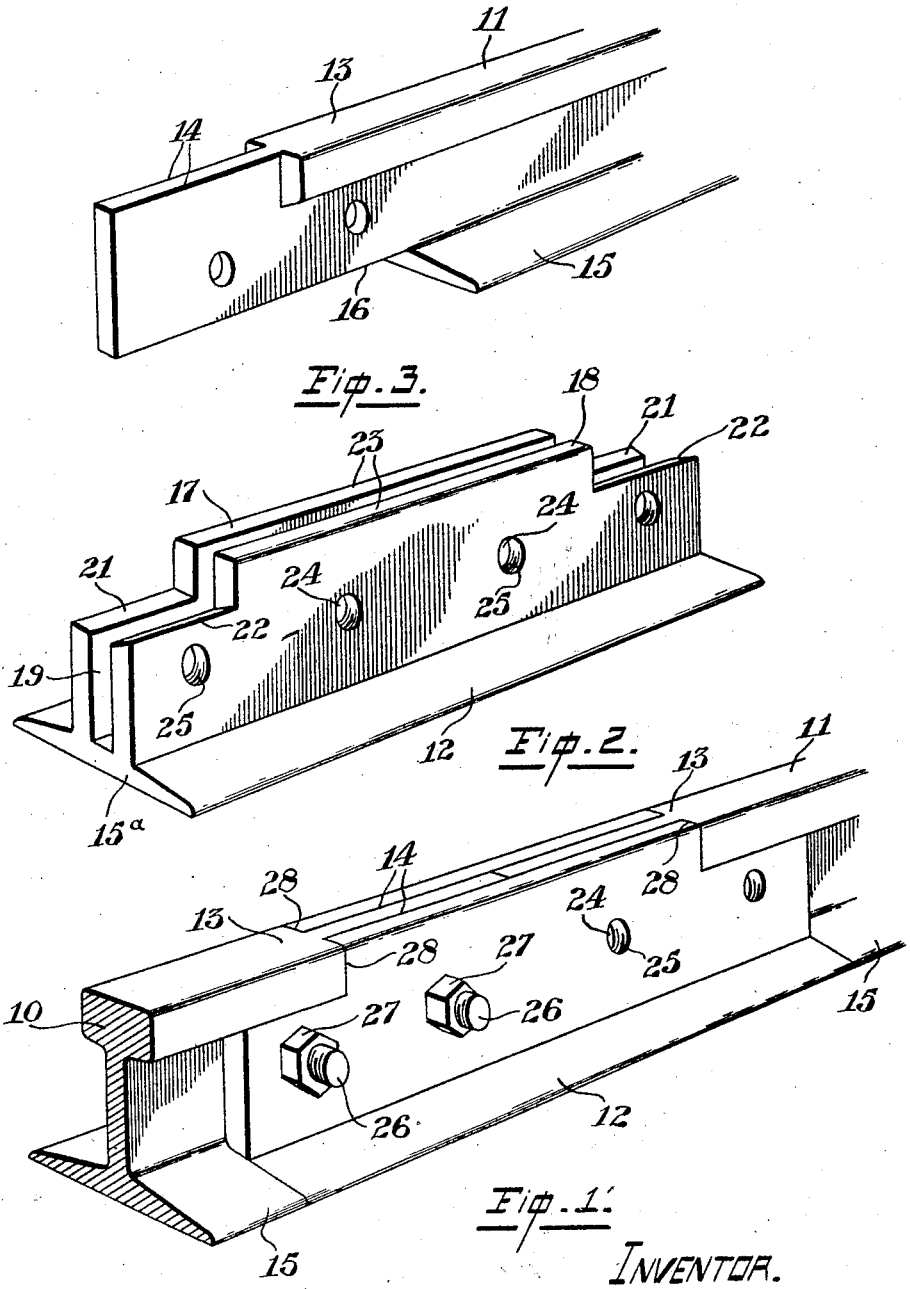

1,565,197

UNITED STATES PATENT OFFICE.

SAMUEL PORTE, OF SYDNEY, NOVA SCOTIA, CANADA.

RAIL JOINT.

Application filed November 17, 1924. Serial No. 750,425.

*To all whom it may concern:*

Be it known that I, SAMUEL PORTE, a subject of the King of Great Britain, and resident of Sydney, in the Province of Nova Scotia and Dominion of Canada, have invented certain new and useful Improvements in Rail Joints, of which the following is a specification.

This invention relates to improvements in rail joints and the objects of the invention are to provide a durable, efficient and simply constructed rail joint, so modified and improved that the several parts will more satisfactorily perform the functions required of them and which can be manufactured without special machinery and marketed in large quantities at low cost.

Further objects are the provision of a rail joint that will strengthen the connection between the ends of rails and at the same time provide a gapless joint.

With the foregoing and other objects in view, the invention consists essentially of the combination with the recessed rails of a joining plate adapted to engage a socket plate provided with a base to register with the rail base and channeled to engage with the recessed ends of the rails and intermediately adapted to form a gapless joint with the rail.

Referring now to the drawings in which like characters of reference indicate corresponding parts in each figure:

Figure 1 is a perspective view of my improved rail joint,

Figure 2 is a perspective view of the channel or socket plate, and

Figure 3 is a perspective detail of the end of a rail.

Referring now more particularly to the drawings, 10 and 11 are rails and 12 is the joining member. At the ends of the rails to be joined, the tread 13 is cut away at 14 and the base 15 is cut away at 16.

Referring now to the joining member or plate 12, this consists essentially of a base 15ª adapted to register with the base 15 of the rails and formed with webs 17 and 18 spaced from one another to provide a channel or socket 19 into which the cut away ends 14 of the rails are designed to fit as illustrated more particularly in Figure 1.

It will be noted that an essential feature in the member 12 is the formation of the webs 17 and 18 which, in addition to providing the socket or channel 19, are partially cut out or recessed at 21 and 22 at each end, the intermediate portions 23 forming treads and being designed, when assembled, to take the place of the cut away portions of the tread of each rail to form a continuous tread over the point of joining of the rails.

In the webs 17 and 18 are provided a series of spaced orifices 24, internally threaded on one side at 25 to engage with bolts 26 provided with securing nuts 27, being designed to obviate the necessity of a lock washer.

It will further be seen that the uncut tread of the rails fits snugly into and takes the place of the cutaway portions of the joining member, the uncut web portion of the rail, as above mentioned, fitting snugly between the channel forming members 17 and 18 of the joining member and while the point of joining between the tread of the rails and the tread of the joining member is partially gapped at 28, there is no complete gap as the cut out web portion of the rail with uncut tread portions fits between the continuous tread portions of the joining member.

As many changes could be made in the above construction and many apparently widely different embodiments of my invention, within the scope of the claims constructed without departing from the spirit or scope thereof, it is intended that all matter contained in the present specification and drawings shall be interpreted in an illustrative and not in a limiting sense.

What I claim as my invention is:

1. A rail joint comprising a socket member formed with a continuous base and continuous spaced webs having treads, the webs and treads being recessed at each end, a pair of rails having the tread and base partially cut away at each end, whereby on the rail and socket member being brought together to form a joint, the web portions of the rails fit between the web portions of the socket member forming in combination therewith a continuous tread and whereby the uncut tread of the rails registers with the cut out portion at each end of the socket member at a point out of alignment with the point of registration between the uncut base of the rails and the base of the socket member.

2. The combination with a pair of rails having the tread and base unequally cut away at each end, of a socket member comprising a continuous base and a pair of tread carrying webs in spaced relationship to one another to form a channel therebetween and the ends of the web members being recessed adjacent the top to receive the uncut tread of the rails on the webs of the rails being inserted in the socket member whereby a continuous tread is formed between the rails and the joining member and means adapted to extend through the webs of the rails and the socket member to form a rigid joint.

3. The combination with a pair of rails, having their ends partially cut away to leave the web and a portion of the tread, of a joining plate comprising a common base, a pair of spaced plates adapted to form webs and treads and having the ends partially recessed adjacent the top and means for rigidly securing the joining member and the rails together.

4. In a device of the character described, the combination with a pair of rails having their base and tread cut away at their ends in such a manner that the uncut web extends beyond the cut away base, a joining member comprising a base, webs integral with the base and separate from each other, partially formed treads on said webs, recesses formed in the web members adjacent the top at each end whereby on the uncut web portions of the rails being fitted between the webs of the joining member, the tread portions of the rails will fit into the recessed ends of the joining member and whereby the base of the joining member will register with the base of the rails at a point not opposite the joining of the treads to form a continuous gapless joint between the joining member and the rails and means for rigidly securing the joining member and the rails together.

In witness whereof I have hereunto set my hand.

SAMUEL PORTE.